United States Patent [19]

Yamaguchi et al.

[11] Patent Number: 4,866,697
[45] Date of Patent: Sep. 12, 1989

[54] INFORMATION MEMORY MEDIUM

[75] Inventors: Ryoji Yamaguchi, Tokyo; Kazuharu Odawara, Yokohama; Nobuo Inage, Tokyo, all of Japan

[73] Assignee: Kabushiki Kaisha Toshiba, Kawasaki, Japan

[21] Appl. No.: 116,660

[22] Filed: Nov. 4, 1987

[30] Foreign Application Priority Data

Nov. 5, 1986 [JP] Japan ................... 61-263353

[51] Int. Cl.⁴ .................. G11B 25/04; G11B 23/00
[52] U.S. Cl. ................... 369/290; 360/133; 369/270
[58] Field of Search .......... 369/272, 264, 280, 282, 369/290, 291; 360/133

[56] References Cited

U.S. PATENT DOCUMENTS

| 4,613,921 | 9/1986 | Holmes | 360/133 |
| 4,634,617 | 1/1987 | Ohta et al. | 369/290 |
| 4,686,666 | 8/1987 | Dieffenbach | 360/133 |
| 4,695,910 | 9/1987 | Maruyama et al. | 360/133 |
| 4,733,388 | 3/1988 | Fujimoto et al. | 369/290 |

FOREIGN PATENT DOCUMENTS

| 26880 | 4/1981 | European Pat. Off. | 369/282 |
| 230963 | 8/1987 | European Pat. Off. | 369/264 |

Primary Examiner—Steven L. Stephan
Attorney, Agent, or Firm—Cushman, Darby & Cushman

[57] ABSTRACT

An optical disk comprising a disk-like body having two base plates made of synthetic resin and two recording layers formed on the base plates, respectively. The body is formed by bonding the base plates, with a spacer interposed therebetween, such that the recording layers face each other. The disk further comprises two centering members, each projecting from the surface of the center portion of one base plate. Each centering member is made of synthetic resin, and one magnetic member is mounted on the centering member. The centering member is inserted in a hole formed in the center portion of the body. The centering member has a center hole defining the center of rotation of the body, and also three projections formed in the surface thereof which faces away from the recording layer. The magnetic member has three engaging holes and is mounted on the centering member, with the projections of the centering member fitted in the engaging holes. Since the optical disk has magnetic members, one on each surface, it can be attracted to the turntable of a drive mechanism by means of the magnetic force exerted by the magnet fitted in the recess formed in the surface of the turntable.

12 Claims, 3 Drawing Sheets

No. 4,866,697

INFORMATION MEMORY MEDIUM

BACKGROUND OF THE INVENTION

The present invention relates to an information memory medium, such as an optical disk, for use in an information processing apparatus, on which information can be recorded and from which it can be reproduced or erased when irradiated by an optical beam, such as a laser beam.

Nowadays, information processing apparatuses which employ an optical disk as a memory medium are in widespread use. During the use of the information processing apparatuses, the information memory medium is held on a turntable. A conventional magnetic memory medium is held on the turntable by a magnetic clamper. The clamper has a magnet, and the turntable is formed of magnetic material. Thus, conventional magnetic memory medium is held on the turntable by the magnetic attraction produced by the clamper. The same type of a magnet clamper is used to hold an optical disk on the turntable of the information processing apparatus.

The inventors hereof have filed U.S. patent application Ser. No. 004,097, which discloses a small-height, lightweight, and low-cost information-processing apparatus having a turntable with a magnet embedded therein, and using an information memory medium (i.e., an optical disk) with a metal plate attached thereto.

This copending application also discloses two types of optical disk. In the first type, the metal plate is directly attached to the main body of the disk. In the second type, the metal plate is connected to a centering member which in turn is attached to the main body of the disk. The information memory medium according to the present invention is of the second type, but is different as regards the means for attaching a metal plate to the centering member of the disk.

SUMMARY OF THE INVENTION

Accordingly, the object of the present invention is to provide an information memory medium which can be securely mounted on or attached to the turntable of an information processing apparatus.

According to the present invention, an information memory medium is provided which is adapted to be driven by a drive mechanism having a turntable for rotating the medium and a magnetic attraction member for magnetically attracting the medium to the turntable. The information memory medium comprises a body having a disk-like base plate, and a recording portion for recording information; a centering member, provided on the center portion of the body, for centering the body on the turntable; and a magnetic member attached to the centering member and adapted to be attracted to the magnetic attraction member. The magnetic member has openings into which are fitted projecting members formed on the centering member, whereby the centering member holds the magnetic member.

BRIEF DESCRIPTION OF THE DRAWINGS

A more complete appreciation of the invention and many of the attendant advantages thereof will be readily obtained, as the same become better understood by reference to the following detailed description, when considered in connection with the accompanying drawings, in which.

DETAILED DESCRIPTION OF THE PREFERRED EMBODIMENTS

Preferred embodiments of the present invention will now be described in detail with reference to the accompanying drawings.

Figure 1:
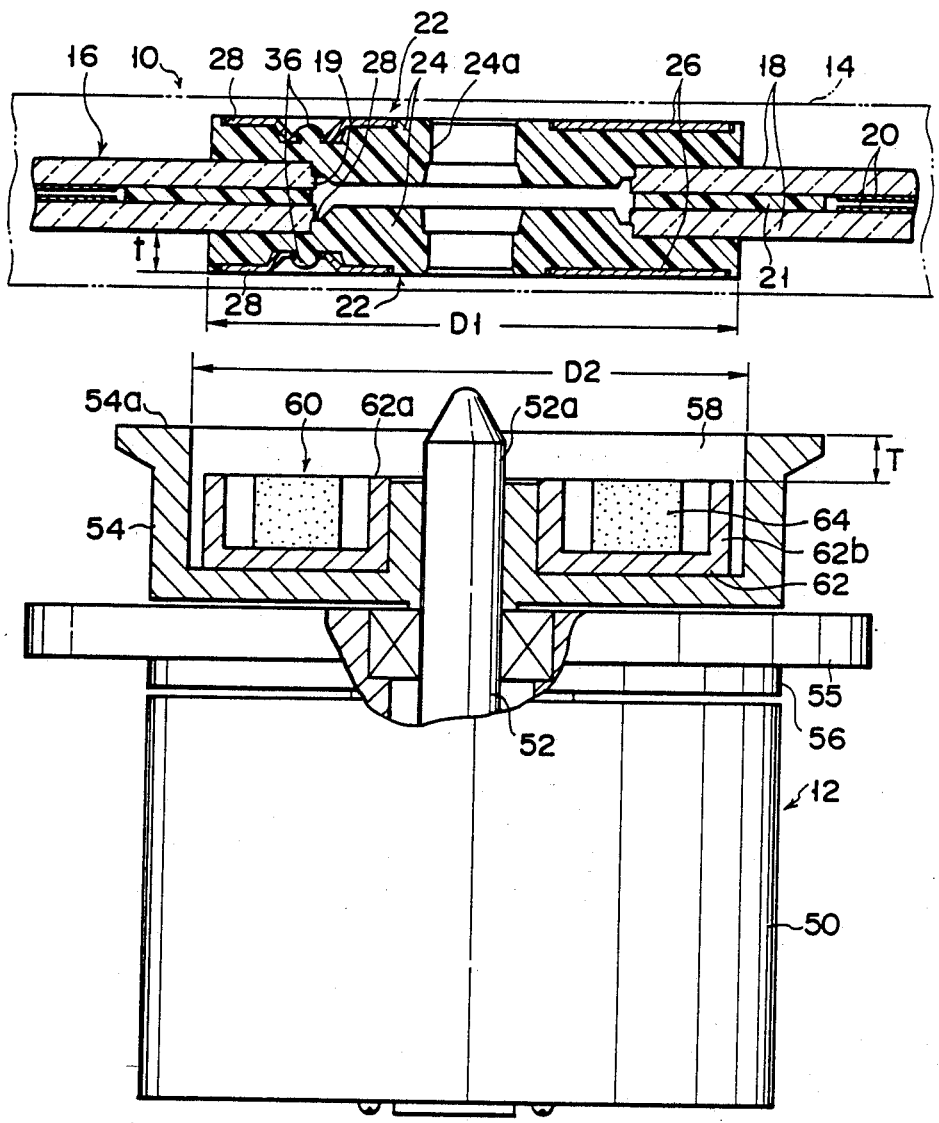
FIG. 1 is a partially cross-sectional side view of an information processing apparatus in which an information memory medium of this invention can be used.

As shown in FIG. 1, an information processing apparatus comprises optical disk 10 used as an information memory medium, and drive mechanism 12 for rotating optical disk 10. Disk 10, contained in cartridge 14 (indicated by two-dot and dash line), is inserted into the apparatus through a medium slot cut in a housing of the apparatus. Thereupon, disk 10 is automatically introduced horizontally into a predetermined position by a medium guiding/loading mechanism. During this process, part of cartridge 14 is open so that the center portion of disk 10 is exposed. Thereafter, cartridge 14 is moved along the plane of disk 10, so that the disk is mounted automatically on drive mechanism 12.

Optical disk 10 comprises body 16 and a pair of attractable members 22. Body 16 comprises two disk-shaped base plates 18, two information recording layers 20, inside spacer 21, an outside spacer (not shown). Either base plate 18 has bore 19 and is made of transparent synthetic resin, such as acrylic resin or polycarbonate, by means of injection molding. Information recording layers 20 are formed on base plates 18, respectively. The spacers, both shaped like a ring, are interposed between those surfaces of base plates 18 which face away from layers 20. The spacers are bonded to each other and also to plates 18 by means of ultrasonic curing, whereby base plates 18 are coupled concentrically.

Figure 2:
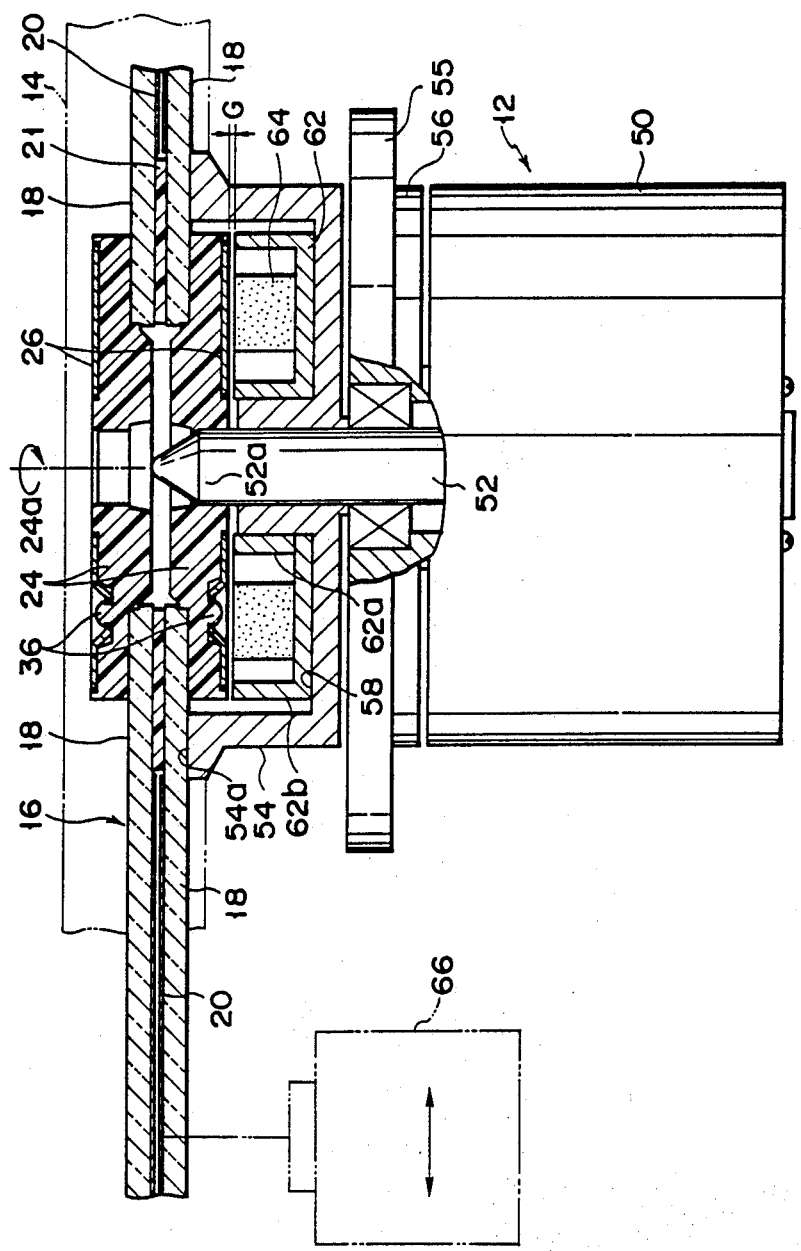
FIG. 2 is a partially cross-sectional side view of the same information processing apparatus, in which the information memory medium of the invention is attached to a drive mechanism.
Figure 3:
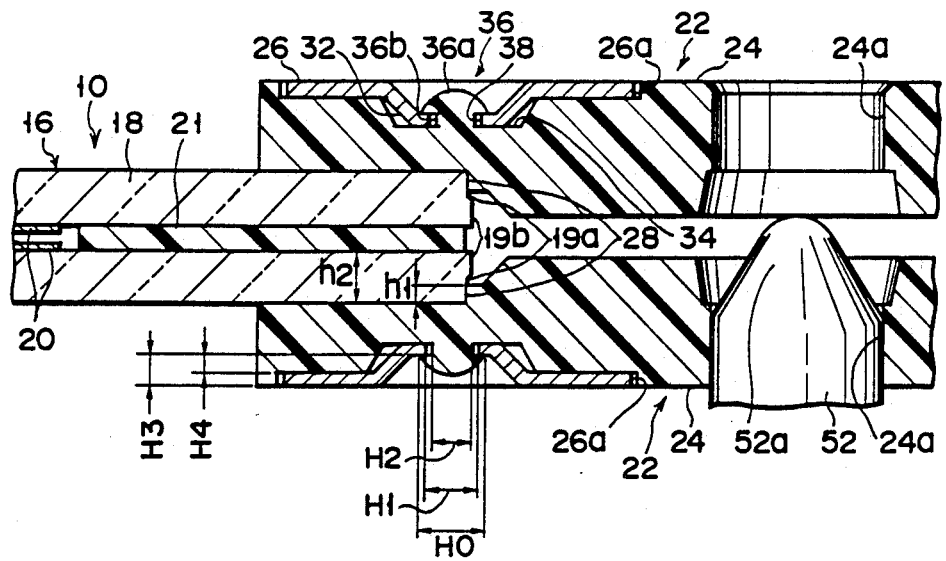
FIG. 3 is a sectional view of an essential portion of the information memory medium according to an embodiment of the present invention.

As is shown in FIGS. 1 to 3, either attractable member 22 is fixed to the center portion of the associated base plate 18. It has centering member 24 and magnetic member 26 attached to the surface of centering member 24.

Centering member 24 is a discoid of thickness t, which is formed of synthetic resin and has center hole 24a. Further, either centering member 24 has ring-shaped projection 28 is fitted in bore 19 of its corresponding base plate 18, it is fixedly bonded to the outer surface of the base plate, or the opposite surface thereof to that surface on which information record layer 20 is formed. Thus, centering member 24 is coaxially positioned relatively to base plate 18. Centering member 24 is bonded to the corresponding base plate 18 by bonding agent such as epoxy resin, which has no adverse influence on base plate 18.

In order to shorten the working time for base plates 18, bore 19 of each plate 18 is formed during the process of injection molding. Base 19 formed in this manner is formed, as shown in FIG. 3, in a stepwise shape having a large-diameter portion 19a and a small-diameter portion 19b formed by exfoliating by a punch in case of cutting by the punch of an injection molding machine.

Large-diameter portion 19a of bore 19 is formed with higher dimensional accuracy than small-diameter portion 19b. Therefore, height h1 of projection 28 of each centering member 24 is shorter than axial length h2 of portion 19a so that projection 28 can engage only portion 19a of higher accuracy. Thus, members 24 are fixed with high positional accuracy, without being substantially eccentric to base plates 18.

Bore 19 of each base plate 18 is worked with high accuracy, so as to be coaxial with a spiral pre-groove (not shown) for recording and reproduction, formed on the base plate. Likewise, the outer peripheral surface of projection 30 and center hole 26a of each centering member 26 are worked with high accuracy, so as to be coaxial with each other. Thus, when member 24 is fixed to base plate 18, the center of the pre-groove is accurately in alignment with that of hole 24a or the center of rotation of base plate 18. It is therefore possible to prevent lowering of recording/reproducing accuracy or increase of access time, while will be caused if the pre-groove is eccentric to the rotational center of base plate 18.

Both centering members 24 are made of the same synthetic resin as base plates 18, and have substantially the same thermal expansion coefficient as base plates 18. Therefore, either base plate 18 and centering member 24 boned to plate 18 do not distort each other even when the ambient temperature changes greatly.

As shown in FIGS. 1 to 4, magnetic members 26 of attractable members 22 are formed of metal in a disk shape having a through hole 26a at the center, and each magnetic member 26 has annular projection 32 coaxial with through hole 26a. Annular recess 34 coaxial with hole 24a is formed in the surface of centering member 24. Recess 34 has a width slightly larger than that of projection 32. Magnetic member 26 is arranged on centering member 24 such that projection 32 is fitted in recess 34. Magnetic member 26 is attached to centering member 24, and cannot move in a direction perpendicular to the surface of base plate 18 since projecting members 36 are fitted in engaging holes 38 (described later), but can slightly move in a direction parallel to the surface of the base plate.

Figure 4:
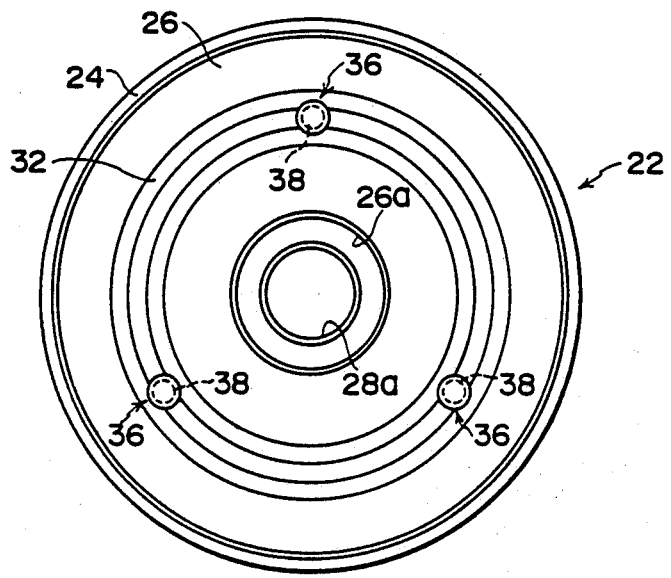
FIG. 4 is a plan view of an attractable member used in the information memory medium.

As shown in FIG. 4, three projecting members 36 are formed on the bottom of recesses 34 of centering member 24, at equal intervals in the circumferential direction. Three engaging holes 38 are formed in magnetic member 26, at equal intervals in the circumferential direction of projection 32 of magnetic member 26. Magnetic member 26 is attached to centering member 24, as described above, since projecting members 36 are fitted in engaging holes 38.

Each projecting member 36 has an elastically deformable detent 36a formed at the end thereof, and a support 36b for supporting detent 36a. Detent 36a has a diameter $H_0$ larger than diameter $H_2$ of support 36b. Each engaging hole 38 has a diameter $H_1$ larger than diameter $H_2$ and smaller than diameter $H_0$. Each detent 36a is positioned far from each engaging hole 38, and each support 36b is disposed in each engaging hole 38 such that projections 36 are fitted in engaging holes 38.

Distance $H_3$ between the surface of magnetic member 26 and recess 34 is longer than height $H_4$ of projecting member 36 so that detent 36a may not project from the surface of magnetic member 26.

To attach magnetic member 26 to centering member 24, magnetic member 26 is so disposed that each engaging hole 38 opposes a corresponding projecting member 36, and magnetic member 26 is pressed to centering member 24 until projection 32 of magnetic member 26 is contacted with the bottom of recess 34 of centering member 24. This causes detent 36a to be elastically deformed so that engaging hole 38 passes detent 36a to engage support 36b with engaging hole 38.

Magnetic member 26 thus attached has its projection 32 interposed between detent 36a and the bottom of recess 34, and cannot move in a direction perpendicular to the surface of base plate 18, but can slightly move in a direction parallel to base plate 18 in a gap between engaging hole 38 and support 36b. In this way, magnetic member 26 can easily be attached to centering member 24 since the mechanism required is simple.

As shown in FIGS. 1 and 2, drive mechanism 12 for driving optical disk 10 includes brushless DC motor 50 of an outer-rotor type, for use as a drive source, and turntable 54 mounted on shaft 52 of motor 50 and adapted to be rotated by motor 50. Tip end portion 52a of shaft 52 is inserted into center hole 26a of disk 10, as will be mentioned later, thus constituting a positioning portion for positioning the disk relatively to turntable 54. Motor 50 is supported by frame 55, which is fitted to control board 56 for controlling the operation of the motor.

Turntable 54, which is formed of nonmagnetic metal, has support surface 54a extending perpendicular to shaft 52 of motor 50. Also, turntable 54 is formed with circular depression 58, which is coaxial with shaft 52, and opens to surface 54a. Diameter D3 of depression 58 is greater than diameter D1 of centering member 24 of optical disk 10. Depression 58 contains magnetic attraction member 60 which magnetically attracts one of attractable members 22 of disk 10. Attraction member 60 includes ring-shaped yoke 62 and magnet 64, which are arranged coaxially with shaft 52. Yoke 62 has inner and outer peripheral walls 62a and 62b, coaxial with each other, and magnet 64 is located between the peripheral walls. The top faces of yoke 62 and magnet 64 are located at distance T from support surface 54a of turntable 54. Distance T is greater than height t of projection of centering members 24 of optical disk 10. Thus, housed in depression 58, magnetic attraction means 60 can fully exhibit its force of attraction for mounting disk 10 on turntable 54, and prevent magnetic leakage to the outside.

As described above, diameter D1 and height t of centering member 24 are smaller than diameter D2 of depression 58 and distance T, respectively. Therefore, if optical disk 10 is set on turntable 54 so that positioning portion 52a of shaft 52 is inserted in one of center holes 24a of attractable members 22, as shown in FIG. 2, one of attractable members 22 is housed fully in depression 58. As a result, magnetic member 25 of the attractable member is attracted to magnet 64, so that disk 10 is mounted in direct contact with support surface 54a of turntable 54.

Thus, base plate 18 having information record layer 20 thereon is held securely to turntable 54. so that vibration of base plate 18 perpendicular to its surface can be minimized. Accordingly, information can be recorded and reproduced correctly. If attractable member 22, not base plate 18, contacted support surface 54a of turntable 54, optical disk 10 would vibrate greatly, unless the surface of member 24 and base plate 18 are very accurately parallel to each other. Therefore, member 24 and the layer of adhesive must have a uniform thickness. It is very difficult, however, to form member 24 and the adhesive layer which have uniform thicknesses.

The length of positioning portion 52a of shaft 52 is such that portion 52a can be fitted in center hole 24a of only the attractable member facing turntable 54 when optical disk 10 is mounted on turntable 54. Hence, it is not required that center holes 24a of centering members 24 are aligned with high accuracy.

If positioning portion 52a were fitted in center holes 24a of both centering members 24, these holes 24a should be coaxially aligned with high accuracy. It is very difficult to align bores 19 of base plates 18 or center holes 24 of members 24. If positioning portion 52a is too long, it takes a long time to set optical disk 10 on turntable 54. This inevitably promotes the wear of centering members 24.

Magnetic attraction means 60 is housed in depression 58 formed in turntable 54, so that magnetic leakage is reduced to a low level. Accordingly, iron filings or powder of other magnetic material does not hinder the engagement of shaft 52 and center hole 24a by sticking to shaft 52.

As mentioned above, height t of projection of either centering member 24 is less than distance T between the top faces of yoke 62 and magnet 64 and support surface 54a of turntable 54. When optical disk 10 is mounted on table 54, therefore, gap G is defined between attractable member 22 and magnetic attraction means 60. Gap G has is so broad that the disk is magnetically attracted to turntable 54. Therefore, as turntable 54 rotates, disk 10 is reliably rotated, and disk 10 can be removed easily from turntable 54 by only lifting cartridge 14. In this embodiment, gap G has such a size that force of attraction of about 700 g acts on attractable member 24.

In FIG. 2, numeral 66 designates a head, which is moved in the radial direction of optical disk 10 by head moving means such as a linear motor. Head 66 can record information on, and reproduce information from, on information record layer 20 formed on lower-side base plate 18.

Since base plate 18 and centering member 24 are formed of synthetic resins having substantially the same thermal expansion coefficient, and magnetic member 26 is further mounted on centering member 24, the base plate and the centering member do not distort each other even if the ambient temperature changes greatly. Therefore, information can be correctly recorded on, or reproduced from, the disk.

Further, since magnetic member 26 can slightly move in parallel with the surface of base plate 18, with respect to centering member 24, the difference of thermal expansion coefficients between centering member 24 and magnetic member 26 can be compensated for, and the distortion of the base plate can be further reduced.

The present invention is not limited to the embodiments described above. Various other changes and modifications may be made within the spirit and scope of the present invention.

However, the base plate may be made of materials other than resins, such as glass, or ceramics. Further, the centering members can be made of any material other than synthetic resin. The centering members can be made of any material having substantially the same thermal expansion coefficient as the material of the base plate. Thus, if the base plates are made of glass, the centering members may be formed of glass or ceramic material.

The embodiments described above are optical disks having two disk base plates. Alternatively, the disk may have only one plate. Further, magnetic attraction means 60 may be formed only of a magnet. Depression 58 in turntable 54 can be hexagonal or rectangular. not circular. Each attractable member 22 must only have shape and size so that it can be housed in the depression.

In the aforementioned embodiments, moreover, the yoke of the magnetic attraction means has inner and outer peripheral walls. Alternatively, it may be provided with only an inner peripheral wall, or only an outer peripheral wall.

In the embodiments described above, detent 36a of projecting member 36 is elastically deformed, and inserted in hole 38 thereby mounting magnetic member 26 on centering member. However, projecting member 36 can be columnar, projecting member 36 can be inserted into hole 38, and the end of the projecting member can form a detent.

In the embodiments described above, three projecting members and engaging holes are formed. However, two projecting members and two engaging holes are sufficient.

What is claimed is:

1. An information memory medium adapted to be driven by a drive mechanism having a turntable for rotating said medium and a magnetic attraction member for magnetically attracting said medium to said turntable, said information memory medium comprising:
   a plane body having a base plate and a recording portion supported by said base plate, for recording information; and
   an attractable member, provided on a center portion of said plane body, for holding said medium to said magnetic attraction member of said turntable,
   wherein said attractable member includes a first member, for centering said body on said turntable, and a second member adapted to be magnetically attracted to said magnetic attraction member of said turntable, said first member having at least one projecting member and being supported by said body, said second member having at least one opening into which said at least one projecting member of said first member is inserted, each said at least one projecting member formed with a supporting portion attached to said first member and a detent supported on said supporting portion, wherein a diameter of said supporting portion is smaller than a diameter of said at least one opening, a diameter of the detent is larger than said diameter of said at least one opening, and said supporting portion is movably engaged with said at least one opening.

2. An information memory medium according to claim 1, wherein said detent has an elastically deformable body, and is inserted in said opening, thereby engaging the supporting member with the opening.

3. An information memory medium according to claim 1, wherein said detent is formed by inserting the projecting member into the opening and then machining the end of the projecting member.

4. An information memory medium according to claim 1, wherein said second member has an annular body and is provided coaxially with the center hole.

5. An information memory medium according to claim 4, wherein said centering member has, in the surface thereof, an annular recess coaxial with the center hole, wherein said projection extends along the circumferential direction of said magnetic member, said projecting member is formed on the bottom of the recess, said opening is formed in the projection, and said magnetic member is attached to the center member, with the projection engaged with the recess.

6. An information memory medium according to claim 5, wherein three projecting members and three openings are formed at equal intervals.

7. An information memory medium according to claim 5, wherein the end of said projecting member is receding from the outer surface of that portion of the magnetic member other than the projection.

8. An information memory medium according to claim 1, wherein said first member has a projection fitted in the through-hole of said base plate.

9. An information memory medium according to claim 8, wherein said projection has a height less than the thickness of the base plate.

10. An information memory medium according to claim 1, wherein said body comprises:
   two base plates;
   two information recording portions formed on said base plated, respectively;
   a spacer; and
   said two base plates bond together with the spacer interposed therebetween such that the information recording portions face each other.

11. An information memory medium according to claim 1, wherein said first member has an annular body.

12. An information memory medium adapted to be driven by a drive mechanism having a turntable for rotating said medium and a magnetic attraction member for magnetically attracting said medium to said turntable, said information memory medium comprising:
   a plane body having a base plate and recording portion supported by said base plate for recording information; and
   an attractable member, provided on a center portion of said plane body, for holding said medium to said magnetic attraction member of said turntable,
   wherein said attractable member includes a first member, for centering said body on said turntable, and a second member being adapted to be magnetically attracted to said magnetic attraction member of said turntable, said first member having at least one projecting member and being fixed to said base plate and having substantially a same thermal expansion coefficient as a thermal expansion coefficient of said base plate, said second member having at least one opening into which said projecting members of said first member are inserted,
   each said at least one projecting member having a supporting portion provided on said first member and a detent supported on said supporting portion, wherein a diameter of said supporting portion is smaller than a diameter of said at least one opening, and a diameter of the detent is larger than said diameter of said at least one opening, and said supporting member being movably engaged with said at least one opening.

* * * * *